SCINTILLATION SCANNER

Original Filed June 1, 1959 5 Sheets-Sheet 1

INVENTORS
JOSEPH B. STICKNEY
CLARENCE E. LEMMERMANN
CARL E. HERRING &
ROLAND W. CARLSON
BY
Watts, Edgerton, Pyle & Fisher
ATTORNEYS

SCINTILLATION SCANNER

Original Filed June 1, 1959 5 Sheets-Sheet 2

INVENTORS
JOSEPH B. STICKNEY,
CLARENCE E. LEMMERMANN,
CARL E. HERRING &
ROLAND W. CARLSON
BY
Watts, Edgerton, Pyle & Fisher
ATTORNEYS

SCINTILLATION SCANNER

Original Filed June 1, 1959 5 Sheets-Sheet 3

INVENTORS
JOSEPH B. STICKNEY,
CLARENCE E. LEMMERMANN,
CARL E. HERRING &
ROLAND W. CARLSON
BY
Watts, Edgerton, Pyle & Fisher
ATTORNEYS

SCINTILLATION SCANNER

Original Filed June 1, 1959 5 Sheets-Sheet 4

INVENTORS
JOSEPH B. STICKNEY,
CLARENCE E. LEMMERMANN,
CARL E. HERRING &
ROLAND W. CARLSON
BY
Watts, Edgerton, Pyle & Fisher
ATTORNEYS

SCINTILLATION SCANNER

Original Filed June 1, 1959 5 Sheets-Sheet 5

INVENTORS
JOSEPH B. STICKNEY,
CLARENCE E. LEMMERMANN,
CARL E. HERRING &
ROLAND W. CARLSON
BY Watts, Edgerton, Pyle & Fisher
ATTORNEYS United States Patent Office Re. 26,014
Reissued May 3, 1966

26,014
SCINTILLATION SCANNER

Joseph B. Stickney, Rocky River, and Clarence E. Lemmermann, Cleveland, Ohio, Carl E. Herring, Palo Alto, Calif., and Roland W. Carlson, Euclid, Ohio, assignors to Picker X-Ray Corporation, Waite Mfg. Div., Inc., Cleveland, Ohio, a corporation of Ohio Original No. 3,070,695, dated Dec. 25, 1962, Ser. No. 817,403, June 1, 1959. Application for reissue Apr. 22, 1965, Ser. No. 460,608
29 Claims. (Cl. 250—71.5)

Matter enclosed in heavy brackets [ ] appears in the original patent but forms no part of this reissue specification; matter printed in italics indicates the additions made by reissue.

This invention pertains to a class of mechanisms known as "Scintillation Scanners."

With modern medical techniques many studies are made by causing the patient to swallow or otherwise absorb quantities of radioactive substances. The distribution of the radioactive substance in the patient's body is then studied. Such studies are useful for many purposes such as the locations of cancerous tissue in the human body and determination of the performance of body organs such as the thyroid gland.

This invention pertains to an improved mechanism for conducting such tracer studies. These mechanisms are known as "Scintillation Scanners." They include a means to move a scintillation probe over an area being studied and a means to provide a graphic reproduction of the activity measured by the probe.

The scintillation scanner of this invention is a portable mechanism which can readily be moved to the patient's bed or other location where a study is to be conducted. The probe is supported cantilever fashion to permit it to be positioned over the body of the patient, or other object to be studied. The cantilever type support affords great flexibility in conducting a study while avoiding the problem of suspending unsightly, heavy, bulky mechanisms over the patient. The suspension of unsightly, heavy mechanisms over a patient causes both problems in supporting the mechanism and psychological fear in the patient as well.

The mechanism is also designed to permit a probe supporting boom to be moved about manually and with facility until the probe is positioned in a desired location. After the probe has been positioned, the boom is operably connected to an automatic drive means to move the probe through a predetermined geographic pattern for a tracer study. The scan can be conducted by moving the probe at a selected speed across a series of parallel paths which are at selected spaced intervals.

A light source and a stylus are carried by the boom and they simultaneously move with it. This simultaneous movement permits production of both graphic and photographic reproductions of the activity measured by the probe during the scan.

Accordingly, one of the principal objects of this invention is to provide a novel and improved scintillation scanner which is simple and easy to use, and which has adjustments to permit a wide variety of tracer studies to be conducted.

A related object of this invention is to provide a novel and improved scintillation scanner made in accordance with the foregoing objective, which scanner is portable.

Another object of this invention is to provide a novel and improved scintillation scanning device in which a probe is supported cantilever fashion over the object being studied, such that essentially only the radiation responsive mechanism is supported over the object.

A further object of this invention is to provide a novel and improved scintillation scanning device which has a reciprocal table boom for supporting a scintillation probe cantilever fashion, and which also supports means for producing a graphic image.

A related object of the invention is to provide a mechanism made in accordance with the preceding object, which mechanism includes both an apparatus to produce a photographic image and an apparatus to produce a graphic image either alternately or simultaneously.

Another object of the invention is to provide a novel and improved mechanism for moving the boom over a predetermined path, which mechanism is adjustable both as to the rate of reciprocation longitudinally and the transverse spacing between such reciprocations.

A similar object of this invention is to provide a movement control mechanism wherein the longitudinal reciprocal means is inactive when translational movement is obtained.

Another object of this invention is to provide a novel and improved mechanism for moving the boom, which mechanism can be facilely disconnected for manual positioning of the boom and thereafter connected to commence an automatic scan from the selected position.

Another object of this invention is to provide a novel and improved scan control mechanism in which the extremes of the scan are selectively adjustable to provide a scan of any selected size, up to the maximum capacity of the machine.

Another object of this invention is to provide a novel and improved scintillation scanning device which will automatically conduct a scan and automatically shut itself off when that scan has been concluded.

A more special object of the invention is to provide a novel and improved stylus of simple inexpensive construction for providing improved graphic studies.

A related object of the invention is to provide a novel and improved stylus support.

Other objects and a fuller understanding of the invention may be had by referring to the following description and claims, taken in conjunction with the accompanying drawings, in which:

Figure 1:
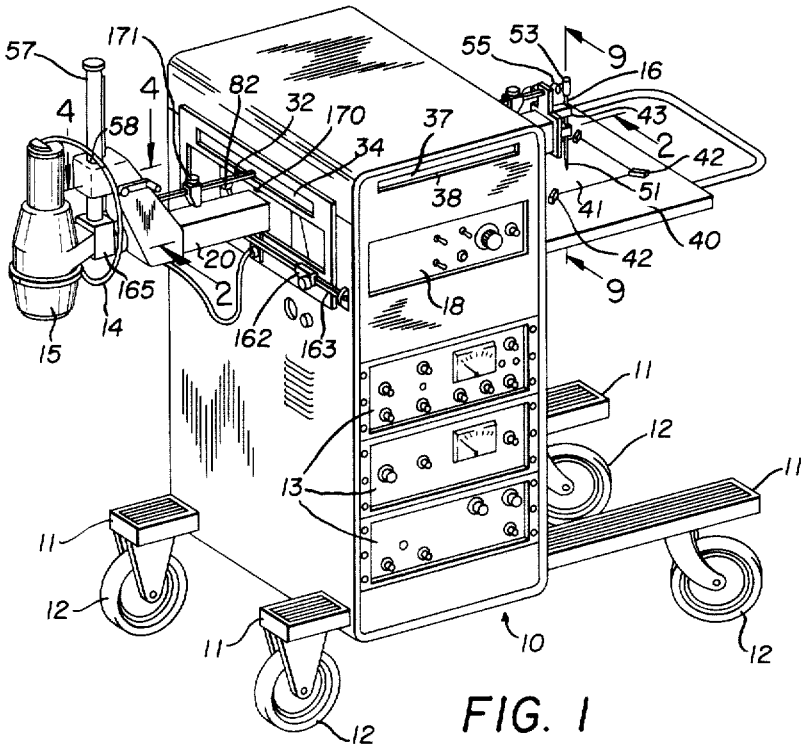
FIGURE 1 is a perspective view of the device.
Figure 4:
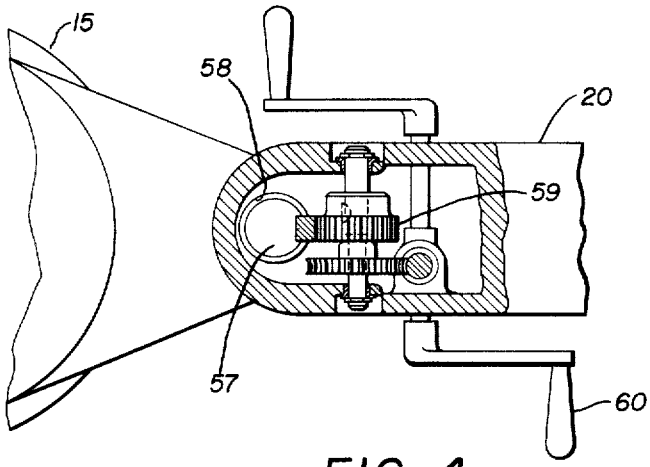
FIGURE 4 is a sectional view above the probe elevation and depression mechanism as seen from the plane indicated by the line 4—4 of FIGURE 1.

Referring to the drawings and to FIGURE 1 in particular, a housing is shown generally at 10. Base members 11 are provided which form a part of the frame structure of the housing. The base members 11 are supported by wheels 12 which give the mechanism mobility.

A plurality of control panels 13 are provided in the front wall of the housing. The control panels 13 include the various dials and knobs needed to control a scintillation circuit. This circuit includes a conductor 14 which transmits impulses from a scintillation probe 15. The impulses are transmitted, monitored, and amplified. The electric impulses are then transmitted through conductor 55 to a stylus 16 and to a light source 17 through a conductor 19. There are many well known circuits which are suitable for this purpose. A preferred circuit is disclosed in copending application for patent Serial Number 820,508, filed June 15, 1959, by Splain, Stickney, and Herring under the title, Scintillation Scanner Circuit. This circuit does not form a part of the present invention and accordingly is not shown in detail here.

In the upper portion of the face of the housing 10 another, or upper control panel 18 is provided. This upper panel 18 includes various operator controlled parts for selective control of the movement of the probe 15 for or during a study. These parts will subsequently be described in greater detail.

A boom 20 is supported in a space 21 in the upper portion of the housing. The boom 20 supports the scintillation probe 15, the stylus 16, and the light source 17. The boom 20 is supported by a transverse carriage 22. The boom 20 is movable reciprocally along a longitudinal path relative to the carriage 22 and the housing 10. The boom 20 is supported for such reciprocal travel by spaced pairs of support rollers 23 which are rotatably supported at the front and the rear of the carriage 22 and by upper guide and support rollers 24. The upper rollers 24 are provided at the front and the rear of the carriage 22 to coact with the vertical support rollers 23 in holding the boom 20 vertically positioned. The upper support rollers are preferably, as shown, connected to the carriage 22 and in contact with the boom 20.

Spaced side rollers 25 are also preferably mounted on the carriage 22 and are coactable with the boom 20. The side rollers 25 hold the boom in a selected transverse position against shifting relative to the carriage 22 in a horizontal path. Preferably, the side rollers 25 are provided both in the front and the rear of the carriage 22.

The carriage 22, in turn, is supported on front and rear guide tracks 26, 27, for rectilinear travel along a path which is transverse to the path of longitudinal boom travel. Since the boom 20 is carried by the carriage 22, the boom will move transversely with the carriage. The guide tracks 26, 27 form a part of the frame structure of the housing 10. A plurality of spaced carriage support rollers 28 and a plurality of coacting carriage positioning and support rollers 29 carry the weight of the carriage 22 on the guide tracks 26, 27. The lower coacting rollers 29 are preferably paired with the upper or carriage support rollers 28. A plurality of horizontal positioning rollers 30 are provided to retain the carrier in its rectilinear path of travel.

A light source support 32 is carried by the boom and forms a part of it. The light source support 32 extends through a light-tight region 33 formed in the housing. The light source 17 is carried by the support at 32 and within the light-tight region 33.

A pair of constant tension coil springs 34, 35 are carried at the front and the rear of the housing and extend across access apertures to the light-tight region 33. Suitable springs are sold under the trademark "Negator" by the Hunter Spring Company. The light source support 32 projects through apertures in the Negator springs 33, 34. The ends of the Negator springs are carried on spaced rotatable coils 36 which are mounted at either end of each light-tight region access aperture. The springs 34, 35 move back and forth with the light source support 32 coiling and uncoiling on the reels 36 to maintain the region 33 light tight.

A suitable film access slot 37 is provided to permit the insertion of the means to hold a sheet of photographic film 38 is exposed by the light source 17 when a scan is being conducted, as will subsequently be described in more detail.

A graph support 40 projects rearwardly from the housing to hold a sheet of graph paper 41. The sheet of paper 41 is of a type which silently records a graphic visual image when an electric charge is passed through the stylus 16 to burn a dot into the paper. One such paper is known as Teledeltos paper and sold by the Western Union Company. The paper 41 is held in position by a plurality of magnets 42.

The stylus 16 is carried in stylus support 43 which may be of electrically insulating material. The stylus support 43 has a through aperture 44 which receives the stylus 16. A stylus positioning member 45 is provided. The positioning member 45 has a pivot end 46 pivotally mounted in a slot 47 formed in the stylus support 43. The pivot 46 is movable rectilinearly in the slot 47 against the action of a spring 48. The stylus positioning member 45 has a stylus abutment part 49 which presses against the stylus 16 under the urging of the spring 48.

Figure 9:
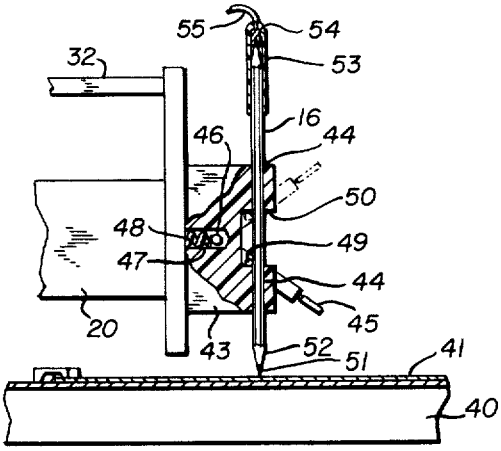
FIGURE 9 is an elevational view of the stylus and support mechanism with parts broken away and removed and as seen from the plane indicated by the line 9—9 of FIGURE 1; and, FIGURE 10 is a wiring diagram of the scan control mechanism.

The stylus abutment part 49 is movable vertically. The vertical travel is limited by upper and lower ends of a notch 50 formed in the stylus support 43. In the position shown in FIGURE 9 the stylus abutment part 49 is against the lower end of the notch 50 and the stylus is held in a graph producing position. To raise the stylus, one merely elevates the stylus positioning member 45. The positioning member 45 compresses the spring 48 until the positioning member has passed the horizontal position which, in this mechanism, is the overcenter position. Thereafter, the abutment part 49 will urge the stylus upwardly under the urging of the spring 48 until the abutment part 49 contacts the top of the notch 50 in the position shown in phantom in FIGURE 9.

One of the outstanding advantages of this invention is achieved through the novel stylus provided. The stylus in its preferred and disclosed form is a drawing pencil sharpened at both ends. It has been discovered that the conventional pencil lead is a very excellent conductor which forms an outstanding electric stylus for "burning" dots in the graph paper 41. With the mechanism shown, the stylus is easily removable by compressing the spring 48 and thereafter either or both ends may be sharpened as needed.

As is well known, the pencil lead is in reality powdered graphite with a binder. The graphite and binder forms a conductor bar which is designated by the numeral 51. It is, as is well known, an elongated bar which fills a tubular passage in wood housing 52 and projects through both ends of the housing. The graphite serves as the electrical conductor for transmitting the electric impulses to be recorded. A "4H" pencil is ideal for this purpose having the appropriate amount of conductivity and sufficient hardness to retain a point for protracted period of operation.

A conductor cap 53 telescopes over the upper end of the stylus 16. The conductor cap 53 has a contact 54 which is in electrical contact with the conductor bar 51 of the stylus 16. The conductor 55 which transmits electrical impulses for the stylus, is connected to the contact 54.

The probe 15 is supported on a support bar 57. The support bar 57 projects through an aperture 58 formed at the outer end of the boom 20. The support bar 57 includes a rack which engages gear 59. The gear 59 forms a part of a gear train which is driven by handles 60 which are journaled in the boom 20. Thus, rotation of the handles 60 in a selected direction will elevate or depress the probe 15. The purpose of this height adjustment will subsequently be described in more detail.

Another of the outstanding advantages of this invention resides in the automatic mechanism for driving the boom in reciprocal paths both longitudinally and transversely. A scan motor 128 is carried on a scan drive bracket 62. The bracket 62 is pivotally mounted on a pair of supports 63 which form a part of the carrier 22. The scan drive motor has a worm gear 64 mounted on its shaft. The worm gear 64 drives a pinion gear 65 which is carried by a shaft 66. The shaft 66 is journaled in the bracket 62.

The shaft 66 has a drive gear 67 fixed to its upper end. The drive gear 67 engages a rack 68 formed alongside of the boom 20. It will be seen that when the gear 67 and the rack 68 are in engagement, rotation of the scan motor 128 in one direction will drive the boom 20 rectilinearly in one direction relative to the carrier 22. Reversing of the direction of the motor 128 will cause rectilinear movement of the boom 20 in the opposite direction relative to the carrier 22.

Movement of the carrier 22 and the supported boom 20 transversely relative to the housing is accomplished by causing an indexing motor 110 to operate. The indexing motor 110 is mounted on the housing 10 and is connected to a gear train 70. The gear train 70 drives a screw 71 which is journaled in the housing 10. The screw 71 is selectively engaged by a split nut shown at 72.

The split nut 72 has upper and lower screw engaging sections 73, 74. The screw engaging portions 73, 74 are slidably carried on a pair of guide pins 75 which are fixed to the carriage 22. The nut 72 includes upper and lower spring retaining members 76, 77. Upper and lower springs 78, 79 are positioned between the upper spring retainer 76 and the upper nut section 73 and between the lower spring retainer 77 and the lower nut section 74, respectively. The springs 78, 79 urge the nut sections 73, 74 toward and into engagement with the screw 71.

In the arrangement thus far described, the gear 67 is in engagement with the rack 68 and the split nut 72 with the screws 71 to provide driving rectilinear movement of the boom relative to the carriage and of the boom and carriage relative to the housing. In conducting a tracer study, it is desirable to be able to shift the probe manually to a desired position, both to locate the center of a scan to be conducted and to position the probe for the start of the scan. One of the outstanding advantages of this invention is the novel and improved mechanism for permitting the manual adjustment of the probe.

Figure 5:
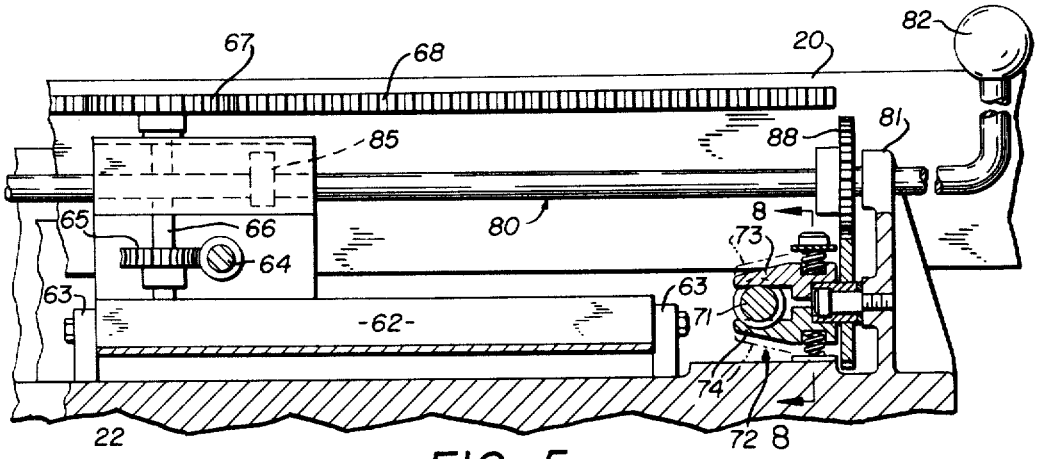
FIGURE 5 is a sectional view of a fragmentary portion of the device as seen from the plane indicated by the line 5—5 of FIGURE 3.

A drive mechanism control bar 80 is rotatably supported by the carriage. The control bar 80 is journaled in a pair of spaced brackets 81, FIGURE 5, provided at the front and the rear of the housing. A control bar handle 82 is provided at the front end of the control bar 80 to facilitate manual rotation of the control bar 80. The control bar 80 is operatively connected to the split nut 72 and the gear 67 to move them into and out of engagement with the screw 71 and the rack 68, respectively.

Figure 6:
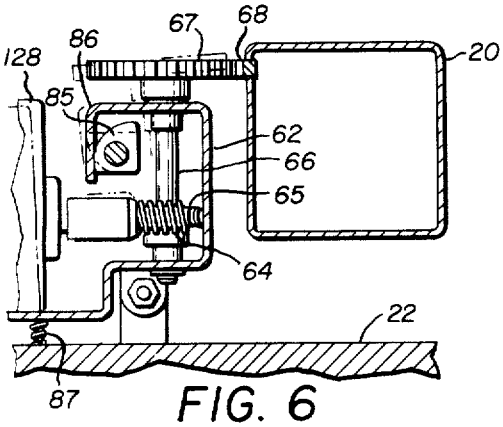
FIGURE 6 is a sectional view of a fragmentary portion of the device as seen from the plane indicated by the line 6—6 of FIGURE 2.
Figure 8:
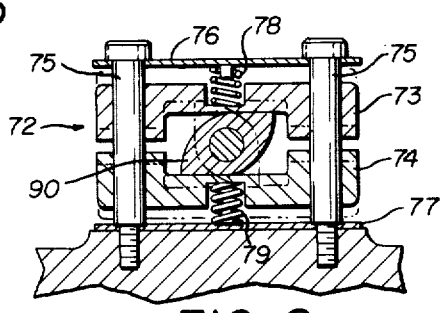
FIGURE 8 is a fragmentary sectional view as seen from the plane indicated by the line 8—8 of FIGURE 5.
Figure 7:
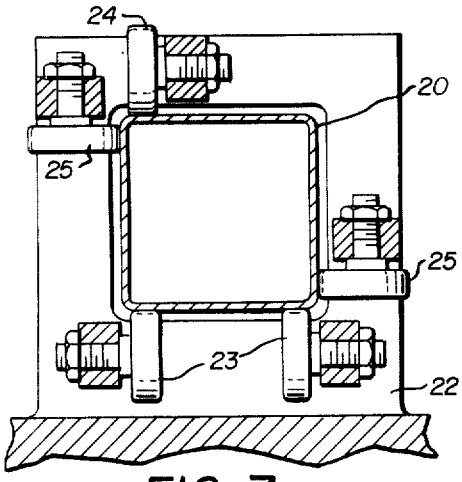
FIGURE 7 is a fragmentary sectional view as seen from the plane indicated by the line 7—7 of FIGURE 2.

When the control 80 is rotated from the engagement to the disengagement position, a scan control cam 85 acts against a lip 86 on the pivotal cam support bracket 62. This action pivots the bracket 62 against the action of a scan bracket support spring 87, FIGURE 6, positioned between the bracket 62 and the carriage 22. Pivoting of the bracket 62 shifts the gears 67 out of engagement with the rack 68 to permit the boom to be shifted longitudinally and relative to the carriage 22.

An indexing disconnection gear 88 is also mounted on the control bar 80. The disconnection gear 88 rotates simultaneously with the control bar 80 and the scan control cam 85. Rotation of the gear 88 causes rotation of the split nut control gear 89 causes a split nut cam 90 to rotate spreading the upper and lower split nut sections 73, 74 to disengage the split nut from the screw 71. Disengagement of the split nut 72 permits the carriage 22 to be moved transversely relative to the housing.

When the handle 82 is released, the springs 78, 79 will urge the split nut 72 back into engagement with the screw 71 and the spring 87 will urge the scan drive gear 67 back into engagement with the rack 68.

INDEXING CONTROL CIRCUIT

Another of the outstanding advantages of this invention resides in the indexing control circuitry. This circuitry will cause the boom to reciprocate longitudinally at any selected speed within a wide range. In addition, when the boom reaches one end of its longitudinal movement, it is indexed transversely automatically any selected distance within a relatively wide range of indexing movement.

Figure 10:
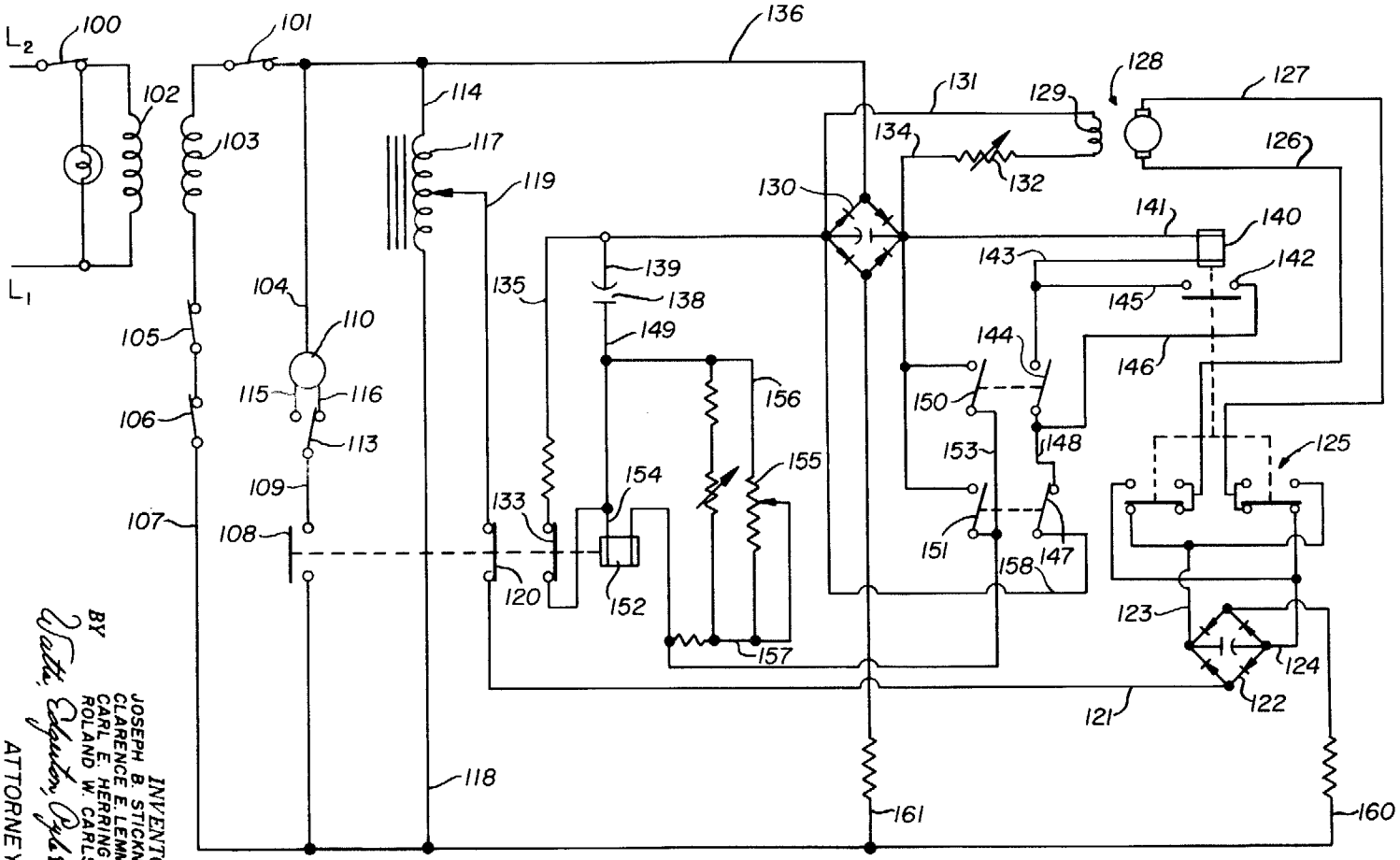

The power for the scanning and indexing movement of the boom is provided through a suitable source of electric potential designated in FIGURE 10 as $L_1$–$L_2$. A primary 102 of a constant voltage transformer is connected to the source of electric potential $L_1$–$L_2$. A main switch 100 is series connected to the primary 102. With the main switch 100 in the closed position, the primary 102 is activated to induce current in a secondary 103.

One side of the secondary 103 is series connected to a scan control switch 101. The scan control switch 101 is connected to one side of the reversible A.C. indexing motor 110 by a conductor 104. The other side of the secondary 103 is series connected to a pair of normally closed limit switches 105, 106. The limit switches 105, 106 in turn are series connected through a conductor 107 to a normally open solenoid activated A.C. motor actuation or control switch 108. The other side of the motor control switch 108 is connected through a conductor 109 to a selector switch 113. A selector switch 113 is selectively connectable to either of the two terminals 115, 116 on the indexing motor 110. The selection switch 113 permits the indexing motor to rotate in a selected direction whenever the switches 100, 101, 105, 106 and 108 are closed.

A winding of a speed control variable transformer 117 is connected to the switches 101, 106 by conductors 114, 118 respectively. Thus, the winding of the variable transformer is connected in series with the secondary 103 of the constant voltage transformer and in parallel with the A.C. indexing motor 110.

The output of the variable transformer 117 is connected through conductor 119 to a normally closed solenoid activated armature control switch 120. The switch 120 is, in turn, connected through a conductor 121 to an armature rectifier 122. The output of the armature rectifier 122 is connected through conductors 123, 124 to a solenoid actuated reversing switch 125. The reversing switch 125 is connected through conductors 126, 127 to the armature of a direct current scan motor 128.

One side of field 129 of the scan motor 128 is connected to a field rectifier 130 by a conductor 131. A variable resistance 132 is connected to the other side of the field 129. The variable resistance 132 is used to adjust the range of the variable transformer 117 which controls the speed of the direct current motor 128 within the selected speed range. The variable resistance 132 in turn is connected to the other side of the field rectifier 130 by conductor 134.

The field rectifier 130 is connected to the scan control switch 101 by a conductor 136. The rectifier 122 and the armature of the motor 128 are in parallel, across the secondary 103, with the rectifier 130 and the connected field 129 and also with the indexing motor circuit. Conductors 160, 161 respectively connect the rectifiers to the limit switches 105, 106 to complete these parallel circuits.

A normally closed solenoid activator and control 133 is connected to the second rectifier 130 by a conductor 135 as a part of a circuit which parallels the field 129. A time delay capacitor 138 is connected in parallel with a normally closed switch 133 by conductors 139, 149.

The field rectifier 130 is also connected to a solenoid 140 by a conductor 141. The solenoid 140 controls a direction condition maintenance switch 142. The other side of the solenoid 140 is connected through a conductor 143 to a normally open reversing limit switch 144. The normally open reversing limit switch 144 is connected through the conductor 145 to the direction maintenance switch 142. The other side of the switch 142 is connected through the conductor 146 to switch 144.

A normally open reversing limit switch 144 is connected in parallel with the switch 142 and in series with the normally closed switch 147 and the rectifier 130, by conductors 148, 152.

A time delay switch 150 is mechanically connected to the normally open reversing switch 144. The time delay switch 150 is open when the reversing switch 144 is open. A second time delay switch 151 is mechanically connected to the normally closed reversing switch 147. The second time delay switch 151 is open when the normally closed reversing switch 147 is closed.

The time delay switches 150, 151 are each connected in parallel with one another and in series with a motor control or time delay solenoid 152 by a conductor 153. The other side of the time delay solenoid 152 is connected through conductors 154 to the switch 133 and the conductor 149. The solenoid 152 controls the normally closed switches 120, 133 and the normally open switch 108, all of which switches are mechanically connected.

A time delay control potentiometer 155 is shunted around the relay 152 by connections through conductors 156, 157. The conductors 156, 157 are connected to the conductors 154, 153 respectively.

When the switches are in the position shown in the drawings, the direct current scan motor 128 will operate to shift the boom 20 longitudinally. As the boom 20 reaches one end of its longitudinal travel, the reversing switch 144 and the time delay switch 150 are closed. Closing of the reversing switch 144 closes the circuit for activating the solenoid 140. Thus, with the switch 144 closed, the current will flow from the second rectifier 130, through the conductor 141, thence, through the solenoid 140 to the conductor 143, through the switch 144, the conductor 148 and the switch 147, and thereafter through the conductor 158 to the otherside of the second rectifier 130. Activation of the solenoid 140 closes the relay switch 142 and shifts the mechanically connected reversing switch 125 to reverse the polarity of the conductors 126, 127 and thereby reverse the direction of the scan motor 128.

The closing of the time delay switch 150 passes current through the conductor 153 to energize the solenoid 152. This opens the normally closed switch 120 to de-energize the armature rectifier 122 and thereby de-energize the armature of the motor 128. It also closes the switch 108 to start the alternating current indexing motor 110. Rotation of the indexing motor 110 shifts the boom 20 transversely to the next scan position.

The solenoid 152 will hold the switches 133, 120 open and the switch 108 closed so long as current flows through the conductor 154 and thence through the conductor 149 to the capacitor 138. The length of time which such current flows is determined by adjustment of the potentiometer 155. As soon as the capacitor 138 is charged, the flow of current through the solenoid 152 will stop and the switches 120, 133 will return to closed positions to start the scan motor. At the same time the switch 108 will open to stop the indexing motor 110. After the switch 133 closes, the condenser 138 will be discharged because the switch 133 forms a parallel circuit with the condenser 138.

Once the switch 120 is closed the circuit through the armature of motor 128 is again complete and the scan motor will begin to operate, this time in a reverse direction. As the scan motor commences to operate in the reverse direction, the boom 20 will move away from the switches 144, 150 permitting them to open. Even though the switch 144 opens, the switch 142 is held in a closed position because a circuit to maintain the solenoid 140 energized is maintained through the normally closed reversing switch 147 and the switch 142.

When the other end of a scan reciprocation is reached the reversing switch 147 is opened. Opening of the switch 147 breaks the circuit activating the condition maintenance solenoid 140. As soon as the circuit to the solenoid 140 is broken, the switch 142 will open and the mechanically connecting reversing switch 125 will return to the position shown in the drawings and again reverse the scan motor. At the same time when the switch 147 is opened, the time delay switch 151 is closed to activate the solenoid 152. Activation of the solenoid 152 will again de-energize the armature rectifier 122 and it will also activate the indexing motor 110 to again index the boom.

When the boom reaches the end of its travel in the direction selected by the positioning of the selector switch 113, either the limit switch 105 or the limit switch 106 will be opened to stop the entire mechanism.

Figure 2:
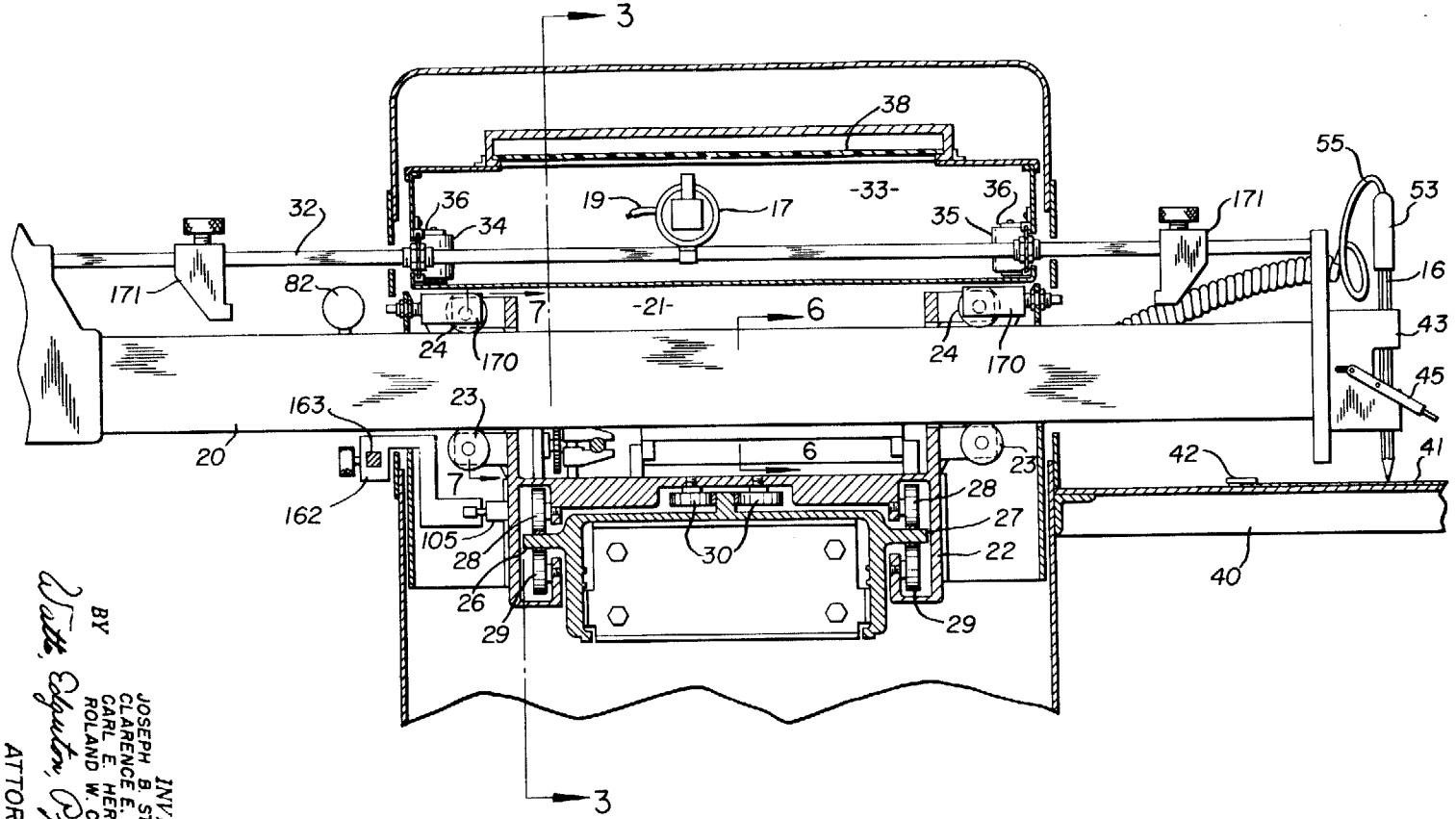
FIGURE 2 is a sectional view of the upper portion of the device as seen from the plane indicated by the line 2—2 of FIGURE 1.

Referring again to the drawings which disclose the mechanical apparatus, a pair of switch housings 170 are shown positioned at the front and the rear of the housing. These are best seen in FIGURE 2. One of these switch housings may hold the reversing switch 144 and the time delay switch 150 while the other of the housings will contain the reversing switch 147 and the time delay switch 151.

A pair of adjustable reversing switch activation members 171 are positioned on the light source support 32. The reversing switch activation members 171 are movable along the slight source support bar 32 to any desired position. The switch activation members 171 activate the reversing and time delay switches. Thus, the extent of the longitudinal travel is adjusted by positioning the switch activation members 171.

Figure 3:
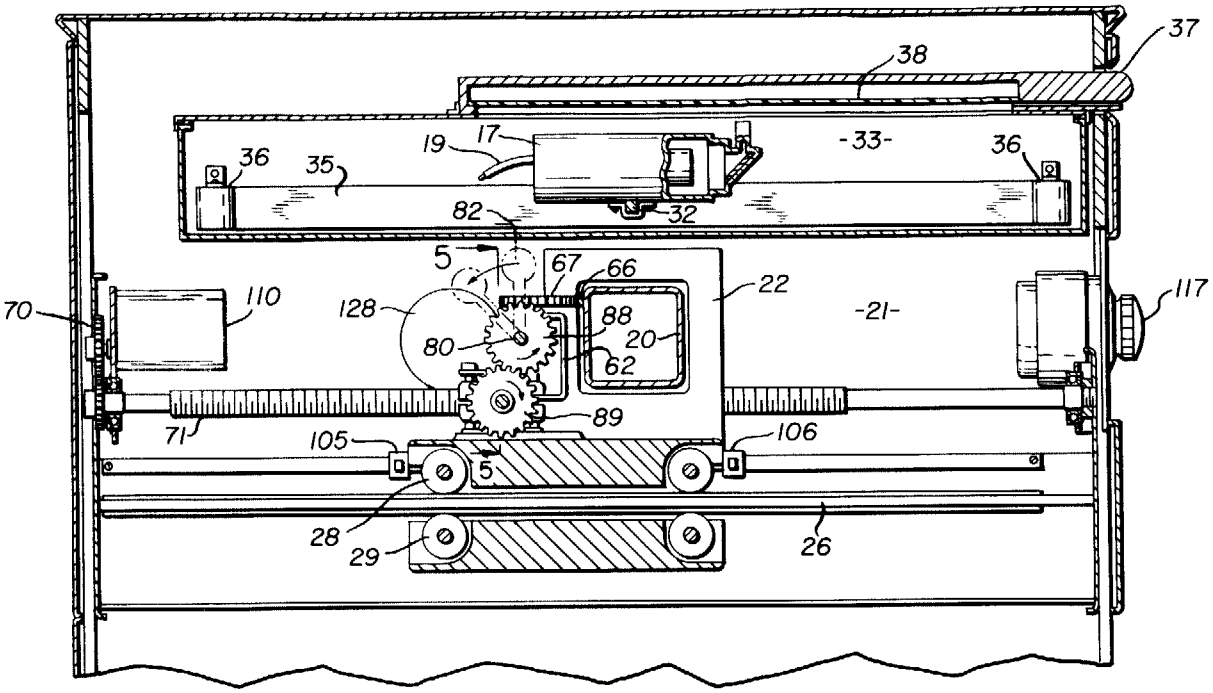
FIGURE 3 is a sectional view of the upper portion of the device as seen from the plane indicated by the line 3—3 of FIGURE 2.

The limit switches 105, 106 are positioned at opposite ends of the carriage 22. These switches 105, 106 are best seen in FIGURE 3. A pair of limit switch actuation members 162 are adjustably carried on a support bar 163. The support bar 163 extends across the front of the housing to place the limit switch actuation members in a position which is convenient for the operator. The limit switch actuation members 162 are adjustable transversely of the housing. When a scan is conducted, the carriage 22 is shifted transfersely periodically by the indexing motor 110 until one of the limit switches 105, 106 engages one of the actuation members 162. This engagement opens a limit switch and stops the entire mechanism.

OPERATION OF THE DEVICE

Since this device is designed primarily for medical use, the operation of the device will be described by describing the conduction of a medical tracer study in detail.

After the patient has swallowed a quantity of radioactive material and sufficient time has passed for the material to be concentrated in the area to be studied, the patient is normally placed in a prone position on a table or bed. The machine is then moved alongside of a bed with probe 15 and the supporting boom 20 extending over the patient. The scanning circuit is then actuated. The control bar 80 is rotated to disengage the carriage and boom shifting mechanism to permit the probe to be moved manually to a desired position.

Next the probe is positioned at the approximate desired location from the patient. There the handles 60 are rotated to elevate or depress the support bar 57 and the supported probe 15 to position the probe a selected space from the patient. The probe 15 may be rotatively supported on the base of the bar 57 as seen at 165, to permit the probe to be rotated to a desired angle.

The probe and boom are shifted longitudinally and transversely to determine both the horizontal extent of the scan to be conducted and the center of concentraion of the radioactive substance. This can be facilitated through the use of an audible sound which is responsive to radioactivity. The circuitry for such audible sound is described in complete detail in the previously cross-referenced copending application for patent.

Once the size of the study to be conducted has been determined, the longitudinal switch activation members 171 are placed in appropriate positions to limit the extent of longitudinal travel. The boom and carriage are moved to one side of the study area, say the right side. The left hand of the two transverse limit switch activation members 162 is then positioned appropriately at the left-hand extremity of the study. The right-hand limit switch activation member 162 is not needed for a right-to-left study, so it may be shifted to the right and out of the way.

Next, the selector switch 113 is positioned for indexing movement of the motor 110 to drive the carriage 22 from the right to the left. With the probe at the right-hand side of the study and positioned at the appropriate height and angle, the handle 82 is released to cause the split nut 72 to engage the screw 71 and the gear 67 to engage the rack 68.

With the probe positioned, the variable transformer 117 is adjusted to provide a selected scan motor speed. The potentiometer 155 is shifted to a desired position to provide appropriate indexing time delay and therefore appropriate spacing between the longitudinal paths of travel.

Once all the adjustments are made, the scan control switch 101 may be closed and the scan will commence. Further adjustments may be made as the scan is progressing, if desired, but normally constant speed and spacing throughout the study is preferred. As the study progresses, the boom will shift longitudinally forward until one of the reversing switches is actuated. Thereafter the boom will shift from right towards the left the predetermined indexing amount and then travel to the rearward extremity of the longitudinal travel. When the boom reaches its rearward extremity, the right-to-left indexing is repeated and the boom again will move forward.

It will thus be seen that a novel and improved device has been described in which a scan study somewhat in the shape of a square wave is conducted. The probe is shifted rectilinearly forward, over, back, over, forward, etc. to describe this pattern which suggests a square wave.

Although the invention has been described in its preferred form with a certain degree of particularity, it is understood that the present disclosure of the preferred form has been made only by way of example, and that numerous changes in the details of the description and the combination and arrangement of parts may be resorted to without departing from the spirit and the scope of the invention as hereinafter claimed.

What is claimed is:

1. A scanning device comprising, a frame, a driven member reciprocally carried by the frame, the driven member being reciprocal relative to the frame in both longitudinal and transverse directions, first drive means operably connected to the frame and to the driven member to shift the driven member relative to the frame reciprocally along a longitudinal path, second drive means to shift the driven member relative to the frame along a transverse path when the first drive means is not operating, *said driven member having an end portion projecting from the frame cantilever fashion with the end of said portion being spaced from the frame at all times,* impulse emitting means carried by the driven member *near said one end, said impulse means being spaced from said frame* and responsive to radiation, and visual image record producing means operably connected to the driven member to record a graphic image in response to impulses from said impulse emitting means.

2. The device of claim 1 wherein the driven member is a boom transverse of the frame and projects from both sides thereof.

3. A scintillation scanning device comprising, a frame and housing structure, the housing defining a scan control space therein, the housing having first and second oppositely located access apertures communicating with said space, a scan boom movably supported by said frame and extending through said space and said apertures, reciprocal drive means carried in said housing and disposed at least in part within said space, said reciprocal drive means being operably connected to said boom to drive the boom reciprocally in a longitudinal scanning path, transverse drive means carried in said housing and disposed at least in part within said space, said transverse drive means being operably connected to said boom to move said boom transversely in a scan indexing path, a scintillatioin responsive element supported at one end of said boom, a graph producing stylus supported at the other end of the boom, a light source carried in the housing and operably connected to said boom to move therewith, and impulse transmission means connecting said element to said stylus and to said light source to transmit impulses from the element to the light source and stylus.

4. A scintillation scanning device comprising, a frame and housing structure, a housing defining a scan control space therein, the housing having first and second oppositely located access apertures communicating with said space, a scan boom movably supported by said frame and extending through said space and said apertures, reciprocal drive means carried in said housing and disposed at least in part within said space, said reciprocal drive means being operably connected to said boom to drive the boom reciprocally in a longitudinal scanning path, transverse drive means carried in said housing and disposed at least in part within said space, said transverse drive means being operably connected to said boom to move said boom transversely in a scan indexing path, a scintillation responsive element supported on said boom on one side of the housing, said housing defining a light tight region, means to selectively position a photographic film in said light tight region, a light source carried in the light tight region and operably connected to said boom to move therewith, and impulse transmission means connecting said element to said stylus and to said light source to transmit impulses from the element to the light source and stylus.

5. A scintillation scanning device comprising, a frame and housing structure, the housing defining a scan control space therein, the housing having first and second oppositely located access apertures communicating with said space, a scan boom movably supported by said frame and extending through said space and said apertures, reciprocal drive means carried in said housing and disposed at least in part within said space, said reciprocal drive means being operably connected to said boom to drive the boom reciprocally in a longitudinal scanning path, transverse drive means carried in said housing and disposed at least in part within said space, said transverse drive means being operably connected to said boom to move said boom transversely in a scan indexing path, control means connected to said reciprocal drive means and to said transverse drive means to selectively connect and disconnect said operable connections, said boom being movable manually when said operable connections are disconnected, a scintillation responsive element supported on said boom at one side of the housing, and image producing means for connection to the scintillation element for providing a graphic representation of an object being studied in response to impulses emitted by said element.

6. A scintillation scanner comprising, a housing, a driven member *assembly,* carriage means supporting the driven member *assembly* and carried by the housing, said carriage *means* including means to permit the driven member *assembly* to move longitudinally and transversely relative to the housing said housing defining a light tight film receiving chamber, the housing also defining a film chamber access slot, [a light source support carried by the driven member for movement therewith, the support] *one portion of the assembly* being disposed through said slot and into the chamber, a light source *forming a part of said assembly and* mounted on [the support and] *said one assembly portion, said light source being* disposed in the chamber, *said assembly having an end portion projecting from the housing cantilever fashion with the end of said end portion being spaced from the frame and said one portion at all times,* a scintillation responsive element *forming a part of said assembly and* carried [by the driven member for connection] *near said end and spaced from the housing, the responsive element being electrically connected* to the light source, and light tight means closing said access slot to permit movement of the [support] *one assembly portion* transversely of the slot while maintaining said film chamber light tight.

7. A scintillation scanner comprising, a housing, a driven member *assembly,* carriage means supporting the driven member *assembly* and carried by the housing, said carriage including means to permit the driven member *assembly* to move longitudinally and transversely relative to the housing, said housing defining a light tight film receiving chamber, the housing also defining a film chamber access slot, [a photo tube support carried by the driven member for movement therewith, the support] *one portion of the assembly* being disposed through said slot and into the chamber, *said assembly including* a photo tube mounted on [the support] *said one portion* and disposed in the chamber, *said assembly having an end portion projecting from the housing cantilever fashion with the end of said end portion being spaced from the frame and* said *one portion at all times, said assembly also including* a scintillation responsive element carried [by the driven member for connection] *near said end and spaced from the housing, the responsive element being electrically connected* to the tube, a constant tension coil spring closing said slot, a pair of rotatable spaced spools supporting the ends of said spring, said spring having an opening therethrough, said [support] *one portion* being disposed through said opening, and means interposed between the spring and the [support] *one portion* to permit longitudinal movement of the support transversely of the spring.

8. A drive assembly for moving a body serially along parallel paths comprising, a support, a carriage movably mounted on the support, a body movably mounted on the carriage, a rack connected to the body, a bracket carried by the carriage, a gear carried by the bracket and selectively engageable with the rack, a drive screw carried by the support and disposed transversely of the rack, a split nut carried by the carriage and selectively engageable with the screw, a rotatable shaft mounted on the carriage and having first and second spaced cams thereon, the first cam being coactable with the split nut and the second cam being coactable with the bracket, the shaft and cams having a disengagement position and an engagement position, the split nut and gear being in engagement with the screw and rack respectively when the cams are in the engagement position, the nut and the gear being disengaged from the screw and rack respectively when the cams are in the disengagement position, a reversible electric motor connected to the gear to sequentially drive the gear in opposite directions, limit switch means selectively positionable on the carriage for activation by a selected extreme of body travel and to reverse the reversible motor when activated, a drive motor operatively connected to the screw for rotation thereof, and means to energize said drive motor when said limit switches are activated to index the body transversely.

9. A scanning device comprising, a frame member defining a transverse guide track, a carriage member reciprocally carried on the frame member guide track, the carriage member defining a guide track disposed transversely of the frame member guide track, a boom element reciprocally mounted on the carriage guide track, a rotatable worm mounted on one of the members, a split nut mounted on the other of the members and engageable with the screw, means to selectively open the nut to disengage it from the screw and to selectively close the nut into engagement with the screw, said carriage and boom being relatively reciprocal elements, a rack carried by one of the elements, a gear carried by the other of the elements, means to shift the gear relative to the rack selectively into and out of engagement with the rack, reversible means to cause rotation of the gear relative to the rack, and means to cause relative rotation of the nut and screw.

10. [In a device having a body for transcribing] *a scintillation scanner comprising:*

(*a*) *housing and frame structure including an access opening;*

(*b*) *a boom extending through the opening and having one portion supported within the structure and an end portion projecting cantilever fashion therefrom, said boom being adapted to transcribe* a wave like path, (*c*) a [body] *boom* drive mechanism *in the structure and connected to the boom, said mechanism* comprising:

(*i*) a first drive means for driving the [body] *boom* along a reciprocal path [,];

(*ii*) a second drive means for shifting the [body] *boom* along a transverse path [,];

(*iii*) settable means to define the limits of the longitudinal path [,];

(*iv*) means actuated by the settable means to reverse the direction of the first means [,];

(*v*) means actuated by the settable means to actuate the second drive means [,]; and, (*vi*) time delay means actuated by the settable means to maintain the first drive means inoperative while the second drive means is in operation.

11. The device of claim 10 wherein the time delay means includes a capacitor.

12. The device of claim 10 wherein the time delay means is adjustable and wherein the time delay means causes the closing of a circuit to actuate the first drive means and simultaneous opening of a circuit to stop the second drive means after an adjusted time interval.

13. In a scintillation scanning device a recording apparatus for producing a graphic image comprising, a stylus housing having a through passage, a support for a graph providing sheet having a generally flat graph producing surface transverse of the housing passage and spaced therefrom, a stylus carried in the housing passage and movable longitudinally therein from a surface abutment position to a storage position, a stylus positioning member having a pivot end and a stylus abutment end, the housing including a positioning member pivot end support element pivotally connected to the pivot end, said element being movable transversely of the passage and relative to the housing, means urging the element toward the passage to maintain the member abutment end in abutment with the stylus, the member being pivotally movable over center and against the action of the urging means from a first to a second position, said stylus being in the surface abutment position when the member is in the first position and in the storage position when the member is in the second position, and said member stylus abutment end being operatively connected to the stylus such that movement of the member from one extreme position to the other causes movement of the stylus.

14. [In a mechanism of the class described] *A scintillation scanner comprising:*

(*a*) *housing and frame structure including an access opening;*

(*b*) *a boom extending through the opening and having one portion supported within the structure and an end portion projecting cantilever fashion therefrom;*

(c) a *boom* drive mechanism *carried by the structure and connected to the boom* comprising [,];

(i) a reversible drive motor for shifting [a body] *the boom* in a reciprocal path, a drive electric circuit connected to the drive motor and to a source of electrical potential, said drive circuit including means to reverse the direction of motor operation [,];

(ii) first and second settable means positionable in seelcted positions at the extremes of such reciprocal path, said settable means including means to actuate said reversing means [,];

(iii) an indexing motor [,];

(iv) an indexing circuit connecting the *indexing* motor to a source of electric potential, said *indexing* circuit including a normally open switch and means to close said switch [,];

(v) said settable means including means to actuate said switch closing means [,]; and, (vi) said drive circuit including time delay means to delay the reversing of said drive motor when said settable means actuates said reversing means.

15. An electric circuit for driving an object over a scanning path comprising, a transformer connected to a source of electric potential, first and second rectifiers, a voltage control means series connected to the first rectifier and to the transformer, the second rectifier being connected to the transformer in parallel with the first rectifier and the voltage control means, a D.C. motor having an armature connected to said first rectifier, a reversing switch series connected with said first rectifier and said armature, said D.C. motor having a field connected to said second rectifier, a normally closed D.C. motor control switch series connected to one of the rectifiers, a motor control switch activation solenoid connected to the other of said rectifiers, a capacitor connected in series with said solenoid, a solenoid control switch connected in series with said motor control solenoid and parallel capacitor, first and second normally open parallel connected time delay switches, said time delay parallel circuit being in series with said solenoid, a reversing control solenoid, a normally open reversing limit switch and a normally closed reversing limit switch connected in series with one another and the solenoid, a direction maintenance actuated by the reversing control solenoid and connected in parallel with the normally open reversing limit switch, the direction maintenance switch being operably connected mechanically to the reversing switch and series connected to the normally closed reversing limit switch and the reversing solenoid, first and second parallel connected time delay switches operably connected mechanically to the open and closed reversing limit switches respectively, said time delay switches being connected in parallel with one another and in series with the motor control solenoid, an alternating current motor connected to a source of electric potential, and a normally open A.C. motor actuation switch series connected to said A.C. motor and operably connected mechanically to said motor control switch, and to said solenoid control switch, and said motor control solenoid being positioned to actuate said motor control switch, said solenoid control switch, and said A.C. motor actuation switch.

16. A scintillation scanner comprising, a housing and frame structure, floor wheels connected to and supporting the structure for movement over a floor, the structure including horizontally disposed tracks near the top thereof, a carriage reciprocally mounted on the tracks, first reciprocal drive means connected to the carriage to cause selective reciprocal movement along the tracks, a driven member reciprocally mounted on the carriage *and including an end portion projecting cantilever fashion from the structure, the end of said portion being spaced from the structure at all times,* second reciprocal drive means connected to the driven member for causing selective reciprocation of the driven member, control means connected to each of the drive means for selectively energizing the drive means one at a time, limit switches adjustably mounted on said structure each positionable for actuation by one of the reciprocal members to delineate a limit of at least one reciprocal movement [and] each limit switch being electrically connected to the control means to actuate the control means to alter the recpirocal movement when one limit of reciprocable movement is reached, *a scintillation responsive member carried by said driven member near said one end and adapted to emit impulses in response to detected radiation, and visual image producing means connected to the driven member at a location spaced from said one portion and electrically connected to said responsive member to produce a visual image corresponding to the detected radiation.*

17. A scintillation scanner comprising a housing and frame structure, floor wheels connected to and supporting the structure for movement over a floor, the structure including horizontally disposed tracks near the top thereof, a carriage reciprocally mounted on the tracks, first reciprocal drive means connected to the carriage to cause selective reciprocal movement along the tracks, a driven member reciprocally mounted on the carriage *and including an end portion projecting cantilever fashion from the structure, the end of said portion being spaced from the structure at all times,* second reciprocal drive means connected to the driven member for causing selective reciprocation of the driven member, control means connected to each of the drive means for selectively energizing the drive means one at a time, said control means including means to adjust the speed of each of said drive means, [and] settable means carried by said structure and positioned to actuate said control means when one of a plurality of predetermined limits of reciprocal travel is reached, *a scintillation responsive member carried by said driven member near said one end and adapted to emit impulses in response to detected radiation, and visual image producing means connected to the driven member at a location spaced from said one portion and electrically connected to said responsive member to produce a visual image corresponding to the detected radiation.*

18. A scintillation scanner comprising a housing and frame structure *including an access opening*, the structure including horizontal tracks, a carriage member reciprocally mounted on the tracks, first reciprocal drive means connected to the carriage to cause selective reciprocal movement along the tracks, a driven *boom* member reciprocally mounted on the carriage member *and projecting through the opening, said boom member including an end portion projecting cantilever fashion past said housing and frame structure,* second reciprocal drive means connected to the driven member for causing selective reciprocation of the driven member, manually actuatable means connected to at least one of the drive means to disable the one drive means and permit manual adjustment of the member driven by the one drive means, said manual means normally enabling the one drive means, [and] control means connected to each of the drive means for energizing the drive means, *a scintillation responsive member carried by said driven member near said one end and adapted to emit impulses in response to detected radiation, and visual image producing means connected to the driven member at a location spaced from said one portion and electrically connected to said responsive member to produce a visual image corresponding to the detected radiation.*

19. The device of claim 18 wherein the manually actuatable means includes a shaft, a handle on the shaft external of said structure, and a cam on the shaft to disable said one drive means when the shaft is rotated to a disabling position.

20. The device of claim 18 wherein the manually actuatable means is operably connected to both of said drive means to simultaneously disable the same when the manually actuatable means is actuated.

21. In combination a frame including a track, a carriage reciprocally carried on the track, a driven member reciprocally carried on the carriage, first drive means between the frame and the carriage for driving the carriage along the track, second drive means between the carriage and the driven member for causing reciprocal movement of the driven member relative to the carriage, a manually rotatable shaft carried by the carriage, and first and second cam means carried on the shaft and operatively connected to the first and second drive means respectively for selectively and simultaneously disabling both such drive means to permit manual movement of the driven member.

22. The device of claim 21 wherein one of the drive means includes a split nut engaging a worm and the other includes a rack and gear and wherein the split nut is opened and the rack is disengaged from the gear when the two drive means are disabled.

23. A scintillation scanner comprising a housing and frame structure, floor wheels connected to and supporting the structure for movement over a floor, the structure including horizontally disposed tracks near the top thereof, a carriage reciprocally mounted on the tracks, first reciprocal drive means connected to the carriage to cause selective reciprocal movement along the tracks, a driven member reciprocally mounted on the carriage, *and including an end portion projecting cantilever fashion from the structure, the end of said portion being spaced from the structure at all times,* second reciprocal drive means connected to the driven member for causing selective reciprocation of the driven member, control means connected to each of the drive means for selectively energizing the drive means one at a time, said control means including means to adjust the speed of each of said drive means, settable means carried by said structure and positioned to actuate said control means when one of a plurality of predetermined limits of reciprocal travel is reached, [and] said control means including time delay disabling and reversing means to disable one of said drive means for a predetermined time interval and to enable said one drive means in a reverse direction after said interval and to energize the other of said drive means during said time interval only, *a scintillation responsive member carried by said driven member near said one end and adapted to emit impulses in response to detected radiation, and visual image producing means connected to the driven member at a location spaced from said one portion and electrically connected to said responsive member to produce a visual image corresponding to the detected radiation.*

24. A scintillation scanner comprising, a housing and frame structure, a support member movably mounted on the housing frame structure, means interposed between the member and the structure to drive the member over a scan path, impulse emitting means connected to the support member and responsive to emitting radiation, said structure including a sheet support for a graph providing sheet, the sheet support having a generally flat sheet supporting surface, a stylus housing connected to said support member, the stylus housing including a through passage, a stylus carried in the housing passage and movable longitudinally therein toward and away from said surface, from a sheet abutment position to a storage position, said stylus being electrically connected to said impulse emitting means for transmitting impulses received from said impulse emitting means to a graph providing sheet, said stylus and impulse emitting means being movable together with said support member over said scan path while maintaining the stylus above said sheet, a stylus positioning member having a pivot end and a stylus abutment end, the stylus housing including a positioning member pivot and support element pivotally connected to the pivot end, said element being movable transversely of the said passage and relative to the stylus housing, means urging the element toward the passage to maintain the positioning member abutment end in abutment with the stylus, a positioning member being pivotally movable over center and against the action of the urging means from a first to a second position, the stylus being in the sheet abutment position when the positioning member is in the first position and in the storage position when the positioning member is in the second position, and said positioning member stylus abutment end being operatively connectable to the stylus such that movement of the member from one extreme position to the other causes movement of the stylus.

25. A scintillation scanner comprising a housing and frame structure, said structure including horizontal tracks, a carriage member reciprocally mounted on the tracks, a first means connected to the carriage member and said structure to cause selective reciprocable movement of the carriage along the track, a driven member reciprocally mounted on the carriage member, a second means interposed between the members to cause selective reciprocation of the driven member relative to the carriage member, control means connected to each of the numbered means for selectively energizing the numbered means one at a time, one of said numbered means being a drive means and the other of said numbered means being an indexing means, said drive means including a reversible drive motor for shifting one of the members in a reciprocal path, said control means including a drive electric circuit electrically connected to the drive motor and to a source of electric potential, said drive circuit including means to reverse the direction of motor operation, said control means also including first and second settable means carried by said structure and positionable in selected positions at the extremes of such reciprocal path, said settable means including means to actuate said reversing means, said indexing means including an indexing motor, said control means also including an indexing circuit connecting said indexing motor to a source of electric potential, said indexing circuit including a normally open switch and means to close said switch, said settable means including means to actuate said switch closing means and drive circuit including a time delay means to delay the reversing of said drive motor when said settable means actuates said reversing means.

26. A scintillation scanner comprising, a housing and frame structure having upright side walls, said upright side walls including a spaced pair of transversely extending apertures, longitudinal tracks within said structure, a carriage within said structure and reciprocally mounted on said tracks, a boom reciprocally carried on said carriage and extending through both of said apertures, a first drive means interposed between the carriage and the frame structure for driving said carriage across said frame, a second drive means interposed between the carriage and the boom for driving the boom reciprocally relative to the carriage, an impulse emitting scintillation responsive member connected to the boom near one end thereof and exteriorly of said structure, a graph producing means connected to the boom near the other end thereof and also exteriorly of said structure, and control means within said structure connected to said drive means for selectively actuating said drive means.

27. A scanning device comprising, a frame a boom reciprocally carried by the frame, the boom being reciprocal relative to the frame in both longitudinal and transverse directions, drive means operably connected to the frame and to the boom to shift the boom relative to the frame reciprocally along a longitudinal path and to shift the boom relative to the frame along a transverse path, impulse emitting means carried by the boom and responsive to radiation, visual image record producing means operably connected to the boom to record a graphic image in response to impulses from said impulse emitting means, and said visual image recording and producing means including a stylus for conducting electrical impulses to an impulse responsive sheet, said stylus comprising a wood insulator having a wood bore and a nonmetallic electric conductor filling the bore, said conductor consisting essentially of a quantity of powdered graphite and a binder.

28. The device of claim 1 wherein the scanning device includes a stylus housing having a through passage, a support for a graph providing sheet having a generally flat graph producing surface transverse of the housing aperture and spaced therefrom, a stylus carried in the housing aperture and movable longitudinally therein from a surface abutment position to a storage position, a stylus positioning member having a pivot end and a stylus abutment and, the housing including a positioning member pivot and support element pivotally connected to the pivot end, said element being movable transversely of the aperture and relative to the housing, means urging the element toward the aperture to maintain the member abutment end in abutment with the stylus, the member being pivotally movable over center and against the action of the urging means from a first to a second position, said stylus being in the surface abutment position when the member is in the first position and in the storage position when the member is in the second position, and said member stylus abutment end being operatively connected to the stylus such that movement of the member from one extreme position to the other causes movement of the stylus.

29. In the device of claim 1 the first and second drive means including, a reversible drive motor for shifting a boom in a reciprocal path, a drive electric circuit connected to the drive motor and to a source of electric potential, said drive circuit including means to reverse the direction of motor operation, first and second settable means positionable in selected positions at the extremes of such reciprocal path, said settable means including means to actuate said reversing means, an indexing motor, and in indexing circuit connecting the motor to a source of electric potential, said circuit including a normally open switch and means to close said switch, said settable means including means to actuate said switch closing means, and said drive circuit including time delay means to delay the reversing of said drive motor when said settable means actuate said reversing means.

References Cited by the Examiner

The following references, cited by the Examiner, are of record in the patented file of this patent or the original patent.

UNITED STATES PATENTS

| | | | |
|---|---|---|---|
| 1,865,610 | 7/1932 | Blair | 101—26 |
| 2,164,946 | 7/1939 | Scheppmann | 346—141 |
| 2,351,319 | 6/1944 | Chase | 346—141 |
| 2,370,163 | 2/1945 | Hare | 250—83.6 |
| 2,454,711 | 11/1948 | Odell | 346—104 |
| 2,554,323 | 5/1951 | Cade | 346—104 |
| 2,639,625 | 5/1953 | Geyer | 74—424.8 |
| 2,677,797 | 5/1954 | Sher | 318—282 |
| 2,703,498 | 3/1955 | Tree | 74—424.8 |
| 2,776,377 | 1/1957 | Anger | 250—71.5 |
| 2,859,396 | 11/1958 | King | 318—282 |
| 2,889,463 | 6/1959 | Linsert et al. | 250—83.3 |
| 2,922,887 | 1/1960 | Jacobs | 250—83.3 |
| 2,967,939 | 1/1961 | Caha et al. | 250—83.3 |

FOREIGN PATENTS

| | | |
|---|---|---|
| 1,023,826 | 2/1958 | Germany. |
| 1,026,008 | 3/1958 | Germany. |

OTHER REFERENCES

Bender et al.: A Versatile High-Contrast Photoscanner for the Localization of Human Tumors With Radioisotopes, International Journal of Applied Radiation and Isotopes, 1959, vol. 4, pages 154–161, Pergamon Press Ltd.

British Journal of Applied Physics, vol. 4, page 353, 1953.

Green et al.: A Free-Moving Isidose Tracing Machine, Nucleonics, April 1958, pp. 92–94.

A High Contrast Photographic Recorder for Scintillation Counter Scanning, from Radiology, May 1956, pages 730 to 739.

MacIntyre et al.: Techniques for the Visualization of Internal Organs by an Automatic Radioisotope Scanning System, International Journal of Applied Radiation and Isotopes, 1958, vol. 3, pages 193–206, Pergamon Press Ltd.

Mauchel et al.: Automatic Isidose Plotter, Nucleonics, December 1954, pp. 50 and 51.

Reid et al.: An Automatic Brain Scanner, International Journal of Applied Radiation and Isotopes, 1958, vol. 3, pages 1–7, Pergamon Press, Ltd., London.

Sopp et al.: Economical Scintillation Scanner, Nucleonics, v. 12, #12, December 1954, page 49.

RALPH G. NILSON, *Primary Examiner.*

A. R. BORCHELT, *Assistant Examiner.*